United States Patent [19]
Bentzley

[11] Patent Number: 5,768,820
[45] Date of Patent: Jun. 23, 1998

[54] SUBDUCTION BRINE SHRIMP HARVESTER

[76] Inventor: Patrick J. Bentzley, 184 E. N. Sandrun Rd., Salt Lake City, Utah 84103

[21] Appl. No.: 310,423

[22] Filed: Sep. 22, 1994

[51] Int. Cl.⁶ .................................................. A01K 81/04
[52] U.S. Cl. .......................................................... 43/6.5
[58] Field of Search ................................... 43/6.5, 4.5, 8; 210/776, 923, 242.3, 242.1, 384, 335; 56/8, 9; 119/205, 213

[56] References Cited

U.S. PATENT DOCUMENTS

| | | | |
|---|---|---|---|
| 1,138,541 | 5/1915 | Conekin | 43/6.5 |
| 1,272,850 | 7/1918 | Robbins | 210/776 |
| 1,486,485 | 3/1924 | Frissell | 43/6.5 |
| 1,591,024 | 7/1926 | Dodge | 210/242.3 |
| 1,619,560 | 3/1927 | Blecker | 43/6.5 |
| 1,717,835 | 6/1929 | Calhoun | 43/6.5 |
| 2,832,168 | 4/1958 | Brown | 43/6.5 X |
| 3,091,880 | 6/1963 | Puretic | 43/8 |
| 3,314,184 | 4/1967 | Lerch | 43/6.5 X |
| 3,360,881 | 1/1968 | Blount | 43/4.5 |
| 3,469,819 | 9/1969 | Puretic | 43/8 |
| 3,661,263 | 5/1972 | Peterson et al. | 210/242.3 |
| 3,709,366 | 1/1973 | Pruitt | 210/242.3 |
| 3,768,193 | 10/1973 | London | 43/6.5 |
| 3,775,890 | 12/1973 | Puretic | 43/6.5 |
| 3,913,254 | 10/1975 | Puretic | 43/6.5 |
| 3,923,661 | 12/1975 | Crisafulli | 210/242.3 |
| 4,086,717 | 5/1978 | Aucoin, Jr. et al. | 43/6.5 |
| 4,117,726 | 10/1978 | McGroddy | 43/6.5 X |
| 4,205,626 | 6/1980 | Muchmore et al. | 43/6.5 X |
| 4,458,621 | 7/1984 | De Clifford | 43/6.5 |
| 4,663,879 | 5/1987 | Bergeron, Jr. | 43/4.5 |
| 4,839,062 | 6/1989 | Sanders | 210/776 |
| 4,998,369 | 3/1991 | Lamon | 43/6.5 |
| 5,042,187 | 8/1991 | Bentzley | 43/6.5 |

FOREIGN PATENT DOCUMENTS 0104702  9/1983  European Pat. Off. .

OTHER PUBLICATIONS

Anthony D'Agostino et al., "An Evaluation of Brine Shrimp Operation On Christmas Island", United Nations Development Advisory Team For The South Pacific (UNDAT), Jun., 1977.
"The Brine Shrimp Industry on the Great Salt Lake", Utah Department of Natural Resources, Bulletin 116, pp. i, v, vi, 243–248, Jun., 1980.
Hales et al., "Federal Aid In Fish Restoration Investigations Of Brine Shrimp", State of Utah Department Of Fish And Game, pp. 1–37, Apr. 15, 1957.
Private Placement Memorandum, pp. i–vi, 1–17, 1978.
"Strange Ways of the Brine Shrimp", 3 pages, extracted from a presentation made in Aug., 1979.

Primary Examiner—Kurt Rowan
Attorney, Agent, or Firm—Trask, Britt & Rossa

[57] ABSTRACT

An apparatus and associated method for collecting brine shrimp eggs (30) floating in a body of water which includes a hollow member (36) having apertures (38) extending therethrough, the apertures being of a size sufficiently large to allow the passage of brine shrimp eggs therethrough, but being sufficiently small that some other debris in the body of water will not pass through the apertures. The hollow member (36) is positioned so that a top portion of its outer surface is submerged in the water beneath a level wherein brine shrimp eggs float in the water. The apparatus also includes a pump (70), connected to the flexible piping (72), to withdraw fluid contained within the hollow member (36) and direct it to a collection area. The apparatus may be associated with a boat (20) or channel carved in the shore associated with a body of water.

15 Claims, 10 Drawing Sheets

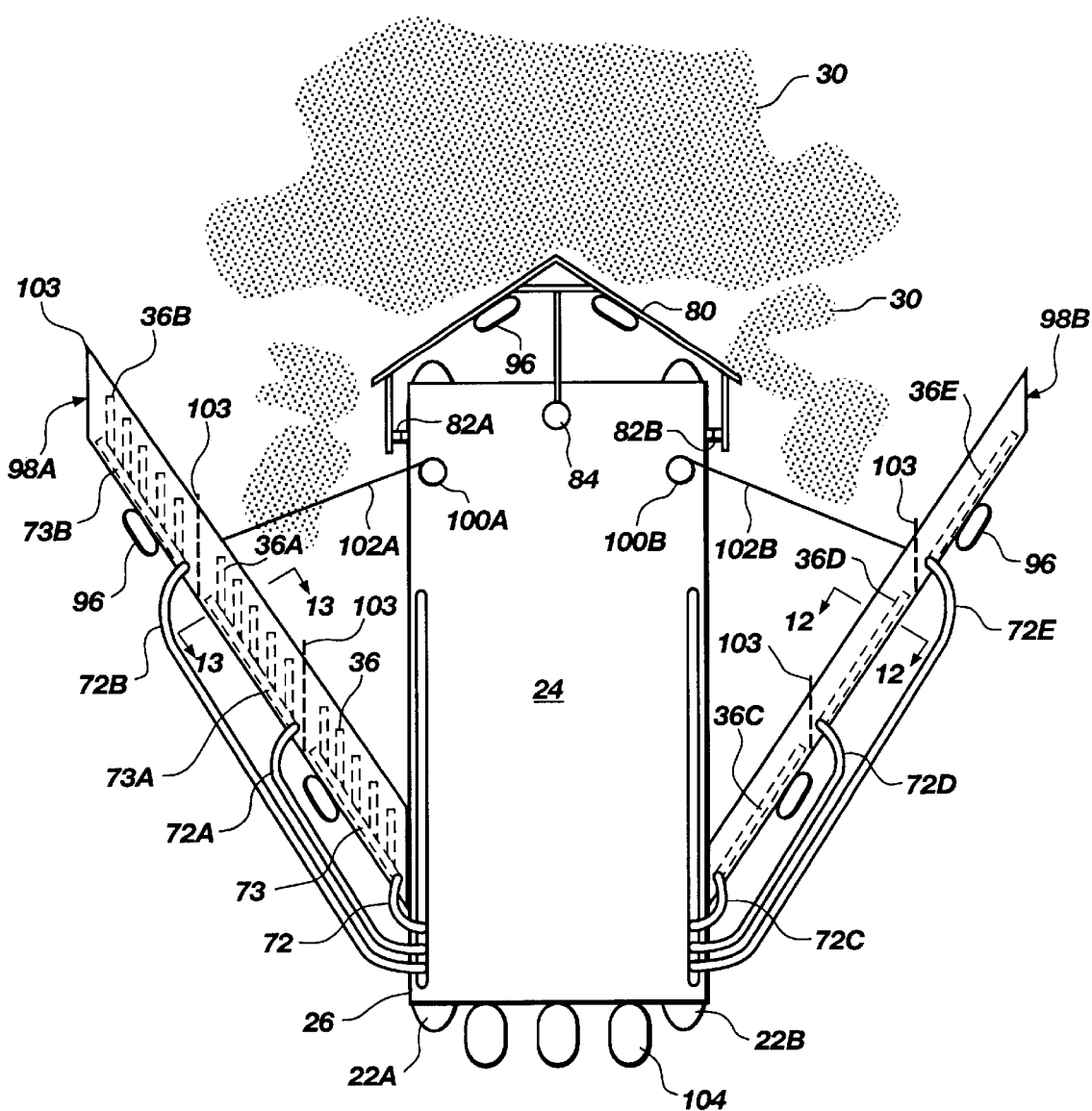
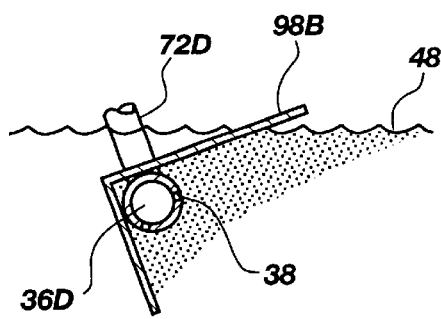 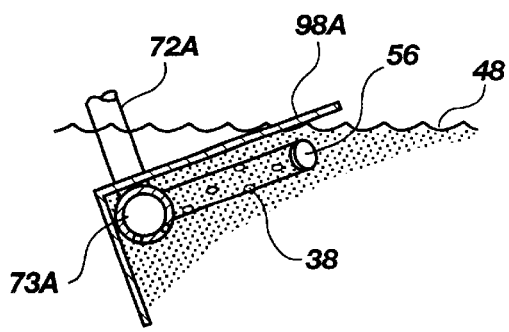
Fig. 11
Fig. 12    Fig. 13

SUBDUCTION BRINE SHRIMP HARVESTER

BACKGROUND OF THE INVENTION

1. Technical Field

The invention generally relates to apparatus and related methods useful in removing materials which are floating at or near the surface of a body of water. More specifically, the invention is an apparatus and method for harvesting brine shrimp eggs.

2. Background

Brine shrimp of the genus Artemia and specifically of the species *Artemia salina* are primitive crustaceans which normally live in bodies of water having a high salt content. Most notably, this form of marine life is found in the Great Salt Lake in Utah and similar lakes and ponds throughout the world.

For many years it has been recognized that the eggs of these crustaceans are capable of withstanding dry conditions over long periods of time. In fact, it has been found that eggs removed from water for over three years will hatch upon their being returned to water. This capacity has led to significant commercial interest in harvesting brine shrimp eggs and thereafter using them either for food for aquarium fish or commercial fish or shrimp farm operations.

Brine shrimp together with their eggs, which will jointly be referred to herein as "brine shrimp," are usually found in colonies or communities which form floating masses on the surface of bodies of water. In order to make harvesting of the brine shrimp cost effective, it is desirable to concentrate a large number of individual brine shrimp colonies into a single large colony or mass.

Brine shrimp eggs are of sufficient size that they are retrievable from the water by use of nets or similar apparatus. Previously, brine shrimp harvesting involved the placement of one or more fences in the water adjacent to the shore. The fences formed a boundary or barrier for the shrimp and thus functioned to trap or direct the shrimp as the tide or wind caused the shrimp colonies to be pushed toward shore. The fences tended to concentrate the smaller shrimp colonies into a sufficiently large and concentrated mass so as to permit relatively cost-effective harvesting. As the shrimp colonies were driven to shore, the harvesters, using hand held nets or shovels, scooped the shrimp from the water or the shore and place the shrimp into storage containers.

Devices for harvesting brine shrimp have also been described. For example, U.S. Pat. Nos. 5,042,187 to Bentzley (issued Aug. 27, 1991), 4,998,369 to Lamon (issued Mar. 12, 1991), 4,839,062 to Sanders (issued Jun. 13, 1989), 3,768,193 to London (issued Oct. 30 1973), describe various devices for harvesting brine shrimp eggs. As identified in U.S. Pat. No. 4,839,062, brine shrimp eggs tend to agglomerate when concentrated, losing their fluid character, making them difficult to pump. Although these devices have helped to improve the harvesting of brine shrimp, it would still be an improvement in the art if an apparatus for harvesting brine shrimp were available which effectively addressed the problem of egg agglomeration.

DISCLOSURE OF THE INVENTION

The invention includes an apparatus for collecting brine shrimp eggs floating in a body of water which involves distributed suction of the eggs. Preferably the apparatus includes means for effecting an agitation of the water, proximate the eggs, to create a slurry which facilitates the collection of the eggs. The apparatus includes one or more hollow members (e.g. a pipe) which define apertures therein. The apertures extend through the structure of the member, thereby communicating the hollow interior of the member with the exterior surface of that member. The apertures are sized sufficiently large to allow the passage of brine shrimp eggs therethrough. Each hollow member is positionable in water so that all of the apertures of that member are submerged in the water preferably beneath the level where brine shrimp eggs float in the water (e.g. from about two to about eight inches underneath the water). The apparatus also includes a pump, or other vacuum producing means, in fluid communication with the interior of the hollow member. The pump creates a pressure differential between the water external to the member and the hollow interior, e.g. a vacuum in the hollow member, for drawing fluid (e.g. brine shrimp eggs in water) through the apertures and into the lumen of the hollow member. The pump also operates to withdraw fluid contained within the interior of the member (including that passaged through the apertures) and to direct it to a collection area.

The apparatus may be associated with a boat or alternatively with a sluice (or channel) carved in the shore of a body of water.

A boat (or vessel) according to the invention may include a buoyant portion (e.g. pontoons with deck, raft, boat) for floating on a surface of a body of water which contains brine shrimp eggs. The hollow member ("perforated hollow member") and the pump may be associated with the boat in several configurations. The perforated hollow member is preferably associated with the boat in such a manner that at least that portion of the hollow member which defines apertures therein is positionable to extend below the surface of the body of water at a level at or beneath that wherein brine shrimp eggs float in the body of water. The pump or vacuum producing means may also direct the fluid away from the hollow interior of the perforated hollow member to a collection area such as a collection container. The vessel can be associated with more than one hollow member and more than one pump.

The invention also includes a method of collecting brine shrimp eggs from a body of water containing such eggs. The steps of the method include (1) providing a perforated hollow member defining a hollow interior and a plurality of apertures communicating the exterior of the member with the hollow interior; (2) directing water believed to contain brine shrimp eggs over the perforated hollow member; (3) creating a vacuum within the hollow interior of the perforated hollow member by a pump or other vacuum producing means; (4) drawing the water through the apertures of the hollow perforated member by means of the vacuum created in the interior of the hollow perforated member; (5) withdrawing the water from the hollow interior of the perforated hollow member (e.g. by means of the pump) so as to draw water from the lumen of the perforated hollow member thus causing the water believed to contain brine shrimp eggs to be continued to be drawn into and through the apertures and into the lumen of the hollow member; and (6) withdrawing the water and eggs from the hollow interior of the member and directing them to a storage site or site for further processing (e.g. water and debris removal).

BRIEF DESCRIPTION OF THE FIGURES

In the drawings, which depict presently preferred embodiments of the invention and in which like reference numerals refer to like parts in different views.

3FIG. 11 is a top view of a boat with side arms and a moveable bow or wedge, utilizing different side arms, one of which incorporates the perforated hollow members to harvest brine shrimp, the other which utilizes a bank of perforated hollow members to harvest brine shrimp.

FIG. 12 is a lateral cross-sectional view of one side arm, taken along section-line 12—12 of FIG. 11.

FIG. 13 is a lateral cross-sectional view of another side arm, taken along section-line 13—13 of FIG. 11.

Figure 14:
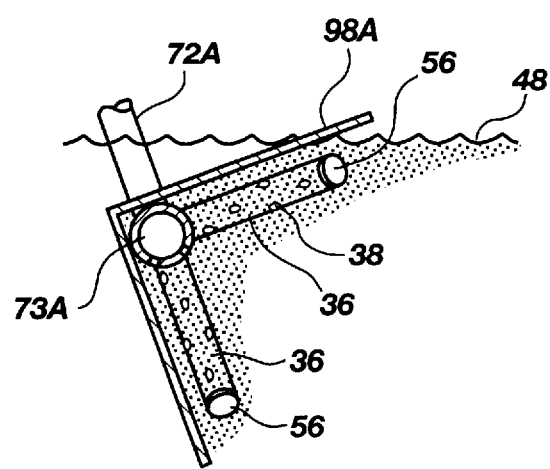

FIG. 14 is an alternative embodiment of the cross-sectional view of FIG. 13.

BEST MODE OF THE INVENTION

Figure 1:
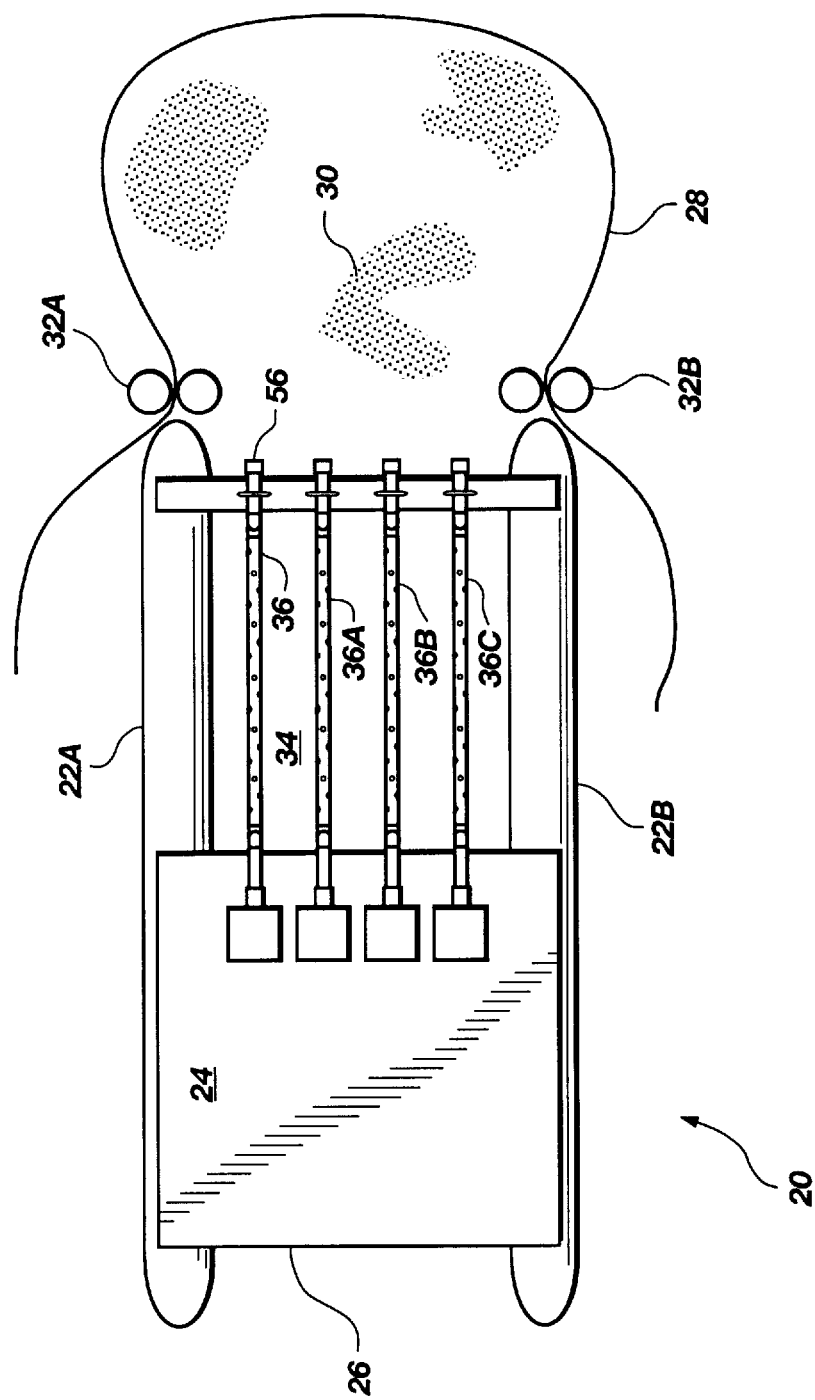
FIG. 1 is a top view of a boat and boom retrieval means, showing the enclosure formed by the boom being spatially reduced by the operation of the boom retrieval means.

As shown in FIG. 1, a boat, generally 20, may be used in harvesting the brine shrimp. Alternatively, a sluice formed in the side of the body of water containing the brine shrimp may be used with the hollow perforated member. The boat 20 preferably includes pontoons 22A, 22B which support a platform or deck 24. The pontoons are typically eighteen to thirty feet long, and spaced eight to sixteen feet apart in a parallel manner. The platform 24 may serve as a support for fishermen, and further may provide space for the hereinafter described draining (de-watering) of brine from the brine shrimp. At the aft portion 26 of the platform 24, an outboard or other motor may be mounted. In one preferred embodiment, the hereinafter described draining of brine shrimp may be accomplished on a separate barge or raft (not shown).

As further shown in FIG. 1, a floating barrier or "boom" 28 may be used to encircle colonies of brine shrimp 30. After a colony of shrimp 30 has been encircled with the boom (e.g. an oil boom), the boom 28 is then drawn in towards the boat 20 by use of winches 32A, 32B, net retriever apparatus or similar means (see e.g., column 4, line 35 to column 5, line 42, and the associated FIGS. 2 and 10 of U.S. Pat. No. 5,042,187 to Bentzley (issued Aug. 27, 1991) and U.S. Pat. No. 3,469,819 to Puretic (issued Sep. 30, 1969), the contents of both of said patents being incorporated in their entirety by this reference). Using a boom 28 tends to segregate the brine shrimp-rich water from water which does not contain brine shrimp colonies, thus decreasing the amount of water which is to be eventually segregated from the brine shrimp. Retrieving the boom 28 draws the brine shrimp in, towards the boat, and the pontoons 22A, 22B serve to contain the brine shrimp in a localized area 34 in front of the platform.

In this area 34, which is shown configured as a generally quadrilaterally shaped recess in the boat's exterior perimeter, is placed at least one hollow perforated member capable of conducting a fluid such as water. It should be understood that the area 34 may be configured in a number of configurations.

In a presently preferred embodiment, the hollow perforated member is a hollow pipe 36. This pipe 36 is preferably circular in cross-section, although it can be triangular, square, rectangular or irregular in cross-section. Preferred pipes include those made of polyvinyl chloride ("PVC"), other polymers, or metal, having a diameter of from two to five inches (preferably three inches). Pipes made of flexible material (e.g. PVC) are ideal, since their flexibility permits the pipe to move during operation of the apparatus, thereby agitating the water in area 34, thereby creating a "slurry" of eggs in water. It has been found that the agitation tends to facilitate the collection of the brine shrimp eggs in that the slurry is more easily drawn through the apertures of the perforated member.

Figure 2:
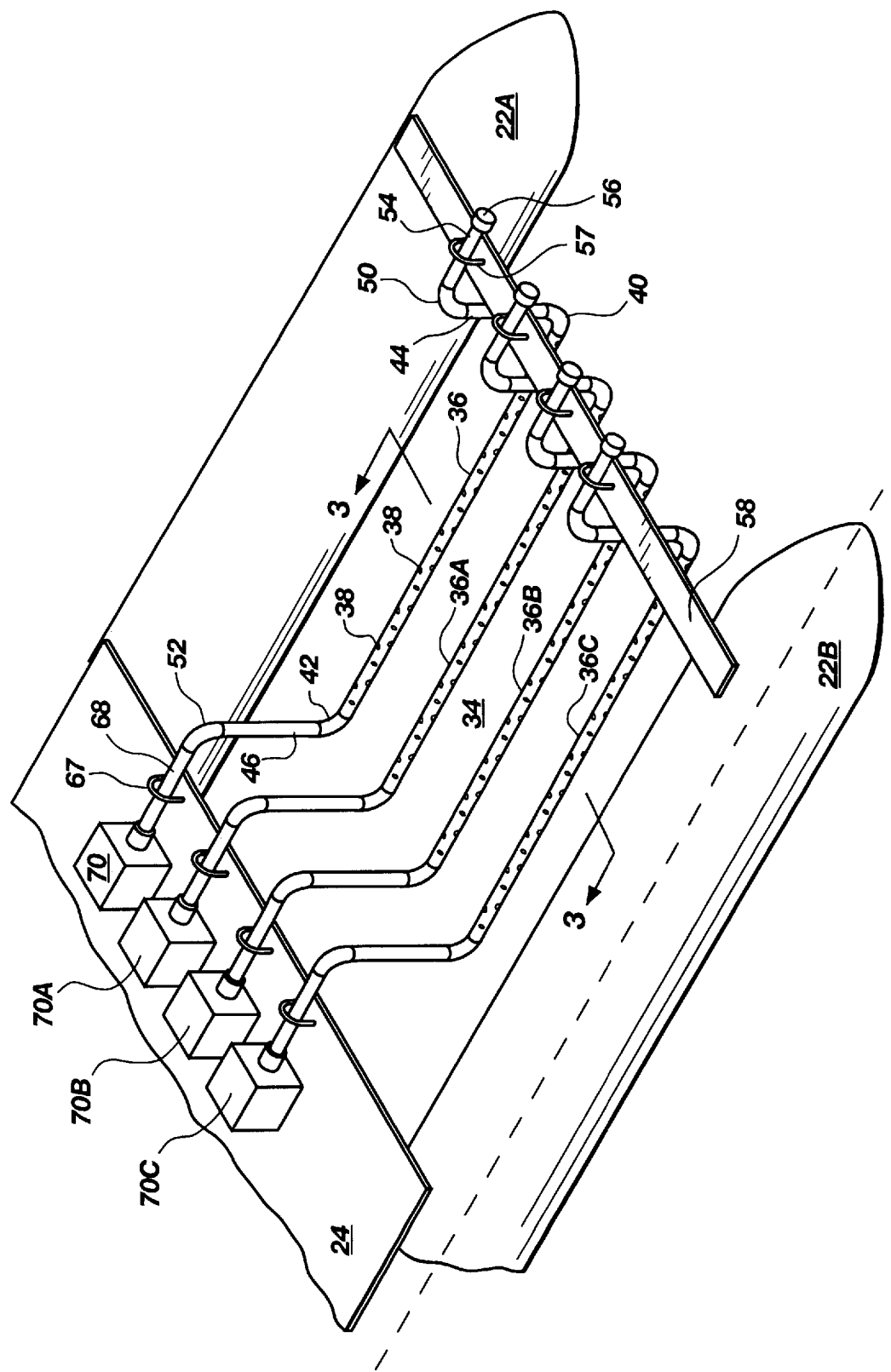
FIG. 2 is a fragmentary perspective view of the prow of the boat of FIG. 1.

As best shown in FIG. 2, the pipe 36 defines a number of suction locations (i.e. apertures 38) along its length which extend through the structure of the pipe and communicate with the interior of the pipe. The apertures provide fluid communication between the exterior surface of the pipe and the hollow interior of the pipe (see, e.g., cross-sectional views of FIGS. 3 to 5). The apertures 38 may be preformed in the surface of the pipe 36, or may be bored therethrough subsequent to the manufacture of the pipe. The apertures 38 are preferably of a sufficient diameter to collect the material to be removed from the water, but small enough to keep at least some of the unwanted matter, e.g. twigs, debris and leaves, from being harvested. In the case of brine shrimp, the apertures will typically vary from about ¼ to about ¾ of an inch in diameter. The hollow member or pipe 36 therefore may serve as a sieve or prefilter.

In the embodiment depicted in FIGS. 1 through 7, the apertures are preferably spaced one to two inches apart. The apertures 38 are preferably positioned spacedly along the entire length of the pipe 36. In a preferred construction, the size of the apertures may be graduated along the length of the pipes, e.g. smaller apertures existing proximate the hereinafter described pipe connection to the pump, and larger apertures existing at pipe locations distal to the connection of the pipe with the pump. The graduation in the aperture sizing tends to equalize the vacuum pressure present at the apertures over the length of the pipe.

In one embodiment (not shown) the hollow perforated member is a U-shaped or C-shaped channel over the top of which has been spread a porous material (e.g. gauze or cloth).

In the embodiment depicted in FIG. 2, fore and aft angular pipe fittings or "elbows" 40, 42 are placed on the ends of the pipe 36. The elbows 40, 42 are also fitted to vertical pipes 44, 46, which may be of the same, greater or lesser lengths (see, e.g., the hereinafter described FIG. 6). The fore vertical pipe 44 may be substituted with a non-hollow member or even an appropriately sized rope or chain (not shown).

The vertical pipes 44, 46 each preferably connect with other elbows 50, 52 on their other end. The fore elbow 50 connects with a horizontal member 54 which may or may not be hollow. In the depicted embodiment, this horizontal member 54 is a section of PVC pipe, on the end of which is applied an end cap 56.

Figure 5:
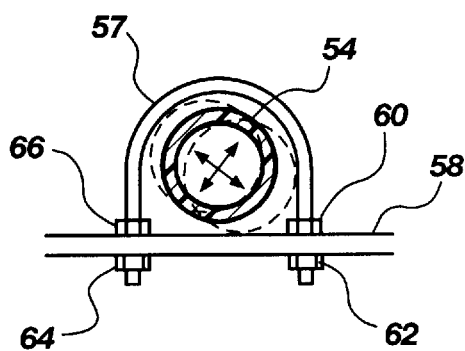
FIG. 5 is a side view of a bracket holding a portion of pipe associated with a hollow perforated member.

The end cap 56 not only serves to close one end of the pipe 36 to assist the hereinafter described suctioning process, but also to help retain the pipe 36 in position. As shown in FIG. 5, a hollow horizontal member 54 is retained by an inverted "u"-shaped bracket 57 attached to a cross piece or cross-member 58 by nuts 60, 62, 64, 66 placed on threaded ends (not shown) of the bracket 57. The bracket 57 defines an opening which is preferably dimensionally larger than that of the cross-sectional area of the horizontal member 54. The bracket opening is configured to permit limited movement of the horizontal member 54, especially lateral movement. The bracket also permits the member 54 to rotate about its longitudinal axis extending between horizontal member 54 and horizontal pipe 68, thereby permitting the hollow member to be rotated into and out of the water. This "looseness" of the horizontal member 54 (the area of allowed movement being shown by the hatched lines in FIG. 5) allows the pipe to move in the water. In preferred embodiments of the invention, a diaphragm pump is connected to the hollow member or pipe 36. The action of the pump tends to impact motion to the hollow member or pipe 36. By loosely mounting the hollow member pipe 36, that member tends to move within its mountings. That portion of the hollow member in the water also moves, thereby agitating the water contained within the localized area 34 between the pontoons 22A, 22B and adjacent the perforated pipe 36. It has been found that this agitation of the water containing the brine shrimp eggs unexpectedly increases the quantity of brine shrimp or other matter which is to be sucked into the perforated pipe 36 or pipes. It is assumed that this agitation may create a "slurry" of eggs and water. Some prior harvesting devices have tended to require a separation of the brine shrimp from all but a small quantity of water in order to operate such devices. This separation requirement typically mandated the need for special separation equipment. The instant invention adopts a different approach. Under the instant method, the eggs need not be separated from the associated water, thereby eliminating any need for such separation equipment at the initial harvesting stage.

The end cap 56 is of a cross-sectional diameter preferably greater than the area defined by the bracket 57, thus preventing the horizontal member 54 to which the end cap 56 is attached (e.g. by threading or using an adhesive) from moving to the aft and slipping out of the bracket 57.

A second bracket 67, structurally similar to the first bracket 57, is mounted to the platform 24. The second bracket retains the other end of the plumbing associated with the pipe 36.

The other elbow 52 associated with the aft vertical pipe 46, elbow 42, and perforated pipe 36 is connected (either directly) (not shown) or indirectly with a horizontal pipe 68 to a pump 70 or similar device for lowering the pressure, e.g. creating a vacuum in the interior of the perforated pipe 36. In alternative embodiments (not shown), a pump may be connected to more than one end of the hollow member or alternatively the pump may be connected to the hollow member at a location along the length of the pipe. The pump creates a vacuum in the interior of the pipe 36, thus drawing in fluid and other matter (such as brine shrimp 30) through the apertures 38. For use in harvesting brine shrimp, a pump such as a gasoline powered diaphragm pump available from Homelite works ideally for a perforated pipe of three inch diameter and six to eight feet in length. It is also contemplated that other types of pumps may also be used, e.g., centrifugal pumps.

It is presently considered that a reciprocating diaphragm pump is preferred due to the vibratory action created by that type of pump in combination with the flexible pipe, and loose pipe mountings which contribute to the favorable agitation of the water.

The length of the elbows 40, 42, 50, 52 and vertical pipes 44, 46 is preferably chosen (taking into consideration the height of the pontoons 22A, 22B and the thickness of the platform 24 and cross-member 58) to allow the perforated vertical pipe to rest at or below the bottom surface of the matter to be collected. In the case of brine shrimp, the top surface of the pipe 36 should preferably rest approximately two to eight inches below the surface of the water 48 when the boat is at rest in calm water.

After the brine shrimp 30 are contained in the localized area 34 adjacent the pipes, the pump 70 is turned on to suction the brine shrimp through the perforated pipe 36. The pump 70 draws the brine shrimp rich water through the pipe 36, through the elbow 42, up the vertical pipe 46, through elbow 52, through horizontal pipe 68, and into its chamber (not shown).

Figure 4:
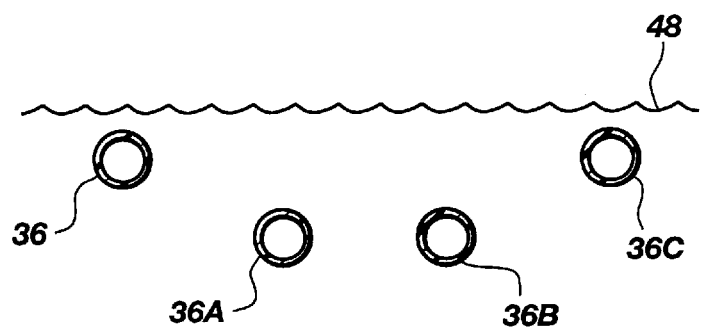
FIG. 4 depicts an alternative embodiment similar to that of FIG. 3.

The brine shrimp-rich water is then preferably directed to a collection area, such as porous cloth bags (e.g. SUPERSACKS) or the like (see e.g., column 8, line 47 to column 9, line 61 and FIGS. 1 and 4 of U.S. Pat. No. 4,839,062 to Sanders (issued Jun. 13, 1989), the contents of the patent being incorporated in its entirety by this reference), where the brine drains away, leaving the brine shrimp in the bags. In one embodiment (not shown) a de-watering process is practiced on the brine shrimp-rich water (see e.g., column 3, line 59 to column 4, line 6; column 5, line 3 to line 46; and the associated figures of U.S. Pat. No. 4,998,369 to Lamon (issued Mar. 12, 1991), the contents of said patent being incorporated in its entirety by this reference).

Any material floating on the water associated with the brine shrimp but not drawn in through the apertures 38 (e.g. feathers, twigs, and sticks) passes behind the boat 20 while the boat moves forward.

Although the embodiments depicted in FIGS. 1 through 4 illustrate multiple perforated pipes 36 through 36C being used, it should be understood that a harvester which utilizes a single perforated pipe is also included within the invention. The use of multiple perforated pipes allows for more thorough collection over a larger area 34 defined by the pontoons 22A, 22B. Multiple perforated pipes also allow for more thorough collection of the brine shrimp. Perforated pipes having a diameter of three inches are typically spaced eight to eighteen inches apart. When multiple pipes 36 through 36C are used, multiple pumps 70 through 70C may be used, or a large pump or pumps (in conjunction with a manifold) may be used to draw fluid from multiple pipes. The use of multiple pumps allows for continued harvesting in the event one or more pumps breaks down during operation, albeit less efficient collection may result. In preferred constructions, each pipe 36 is associated with a respective pump 70.

When multiple pipes 36 are used, various arrangements of those pipes are contemplated. As shown in FIGS. 1–11, many of these arrangements provide for the pipes to be arranged parallel to one another. As shown in FIG. 2, the pipes 36 may be arranged to be parallel to the longitudinal axis of the boat, e.g., the longitudinal axis of the pontoon 22B.

Figure 3:
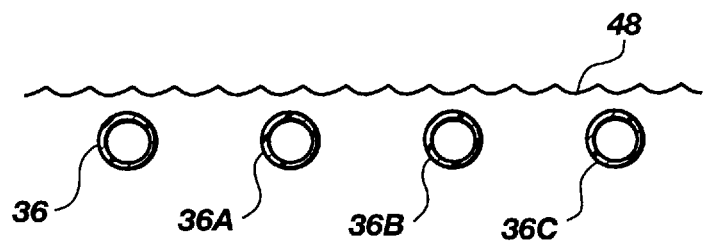
FIG. 3 is a lateral cross-sectional view of the hollow perforated members of a boat underneath the surface of water made according to the invention, taken along section-line 3—3 of FIG. 2.

As shown in FIG. 3, the multiple perforated pipes 36 through 36C may be all arranged at the same elevational level underneath the water, i.e. in a horizontal plane.

Alternatively, as shown in FIG. 4, the various pipes may be arranged at different elevational levels underneath the surface of the water 48.

Figure 6:
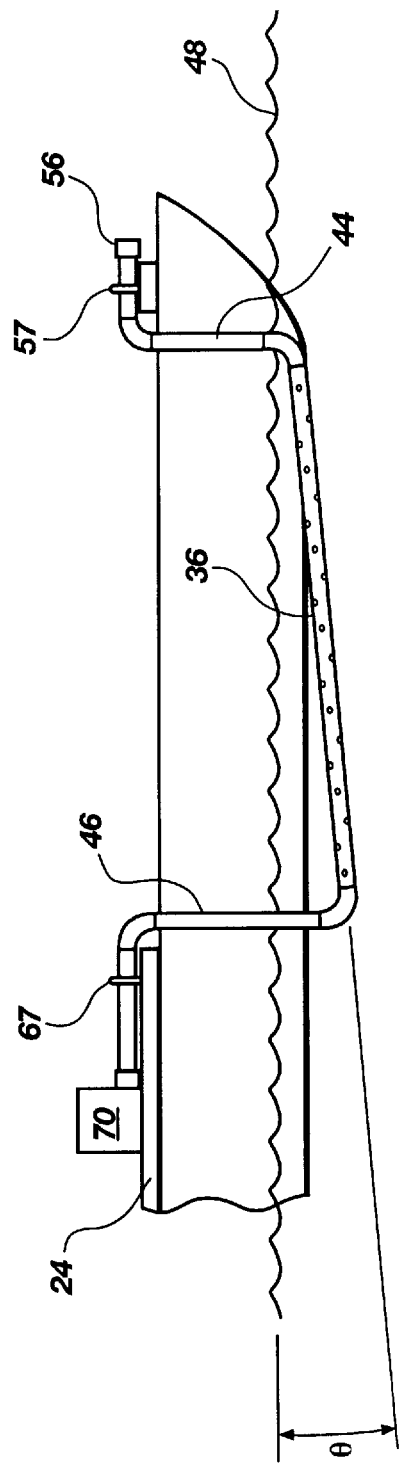
FIG. 6 is a fragmentary side view of one embodiment of the invention in use with a boat as per FIG. 1.

In some embodiments of the invention, the elongate pipes 36 may be positioned to be substantially horizontal, i.e. the longitudinal axis of the pipe is positioned parallel to the water surface 48. In other constructions, the pipes may be inclined from the vertical, and generally positioned in a vertical plane. As shown in the embodiment depicted in FIG. 6, the fore vertical pipe 44 may be shorter than the aft vertical pipe 46, and the pipe 36 is accordingly not parallel with the surface of the water 48. The angle θ depicted in FIG. 6 is the angle between the pipe 34 and the surface of the water 48, and varies from about 0° to 180° and preferably between 10° to 60°. Such an arrangement allows for undesirable debris floating underneath the surface of the water 48 to be efficiently deflected, and increases the efficiency of the herein described collection of brine shrimp.

Figure 7:
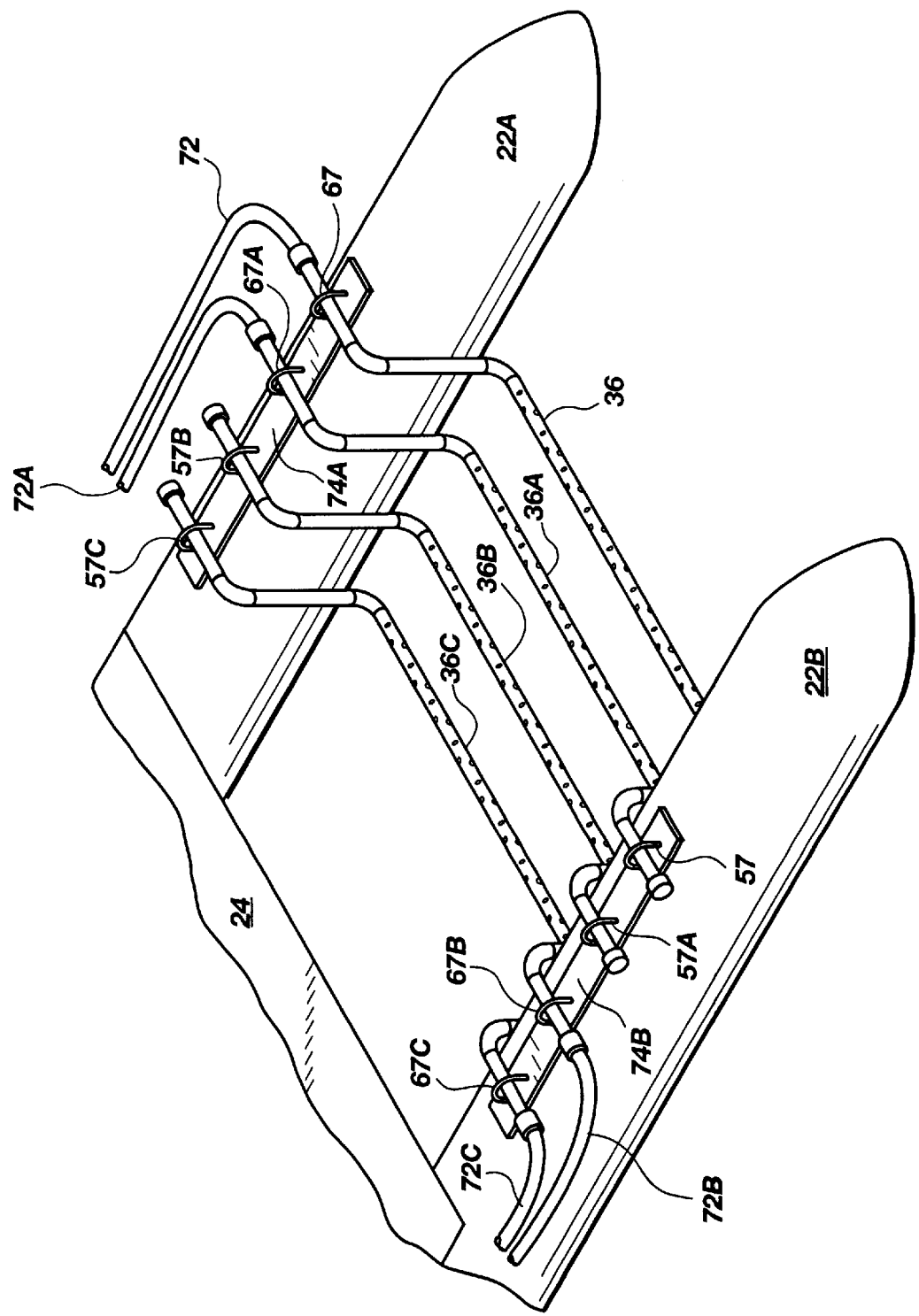
FIG. 7 is a fragmentary perspective view of the prow of a boat using a preferred embodiment of the invention.

Another embodiment of the invention is depicted in FIG. 7. In this embodiment, the hollow perforated members 36 through 36C are arranged parallel to one another and perpendicularly to the longitudinal axes of the pontoons 22A, 22B. Such an arrangement allows for highly efficient collection of the brine shrimp. Whatever brine shrimp are not sucked into the apertures of the first collection pipe 36 pass on for collection by the second pipe 36A, third pipe 36B, and so on.

Again, the pipes are preferably loosely mounted within the brackets 57 through 57C, 67 through 67C to agitate the localized area 34 where collection is to be undergone. Such an attachment to the boat allows for the pipes 36–36C to "swing" within the brackets by movement of the boat or water, or by manual manipulation, collecting a greater proportion of the brine shrimp present in the water.

Other than the preferably flexible, piping 72, 72A, 72B, 72C used to transport the brine shrimp-rich water to the pump or pumps (not shown) and supports 74A, 74B, the arrangement works as previously described with regard to FIGS. 1 through 6. The supports 74A, 74B may be made of any material capable of supporting the respective brackets 57–57C, 67–67C, for example, wood, plastic or metal.

Figure 8:
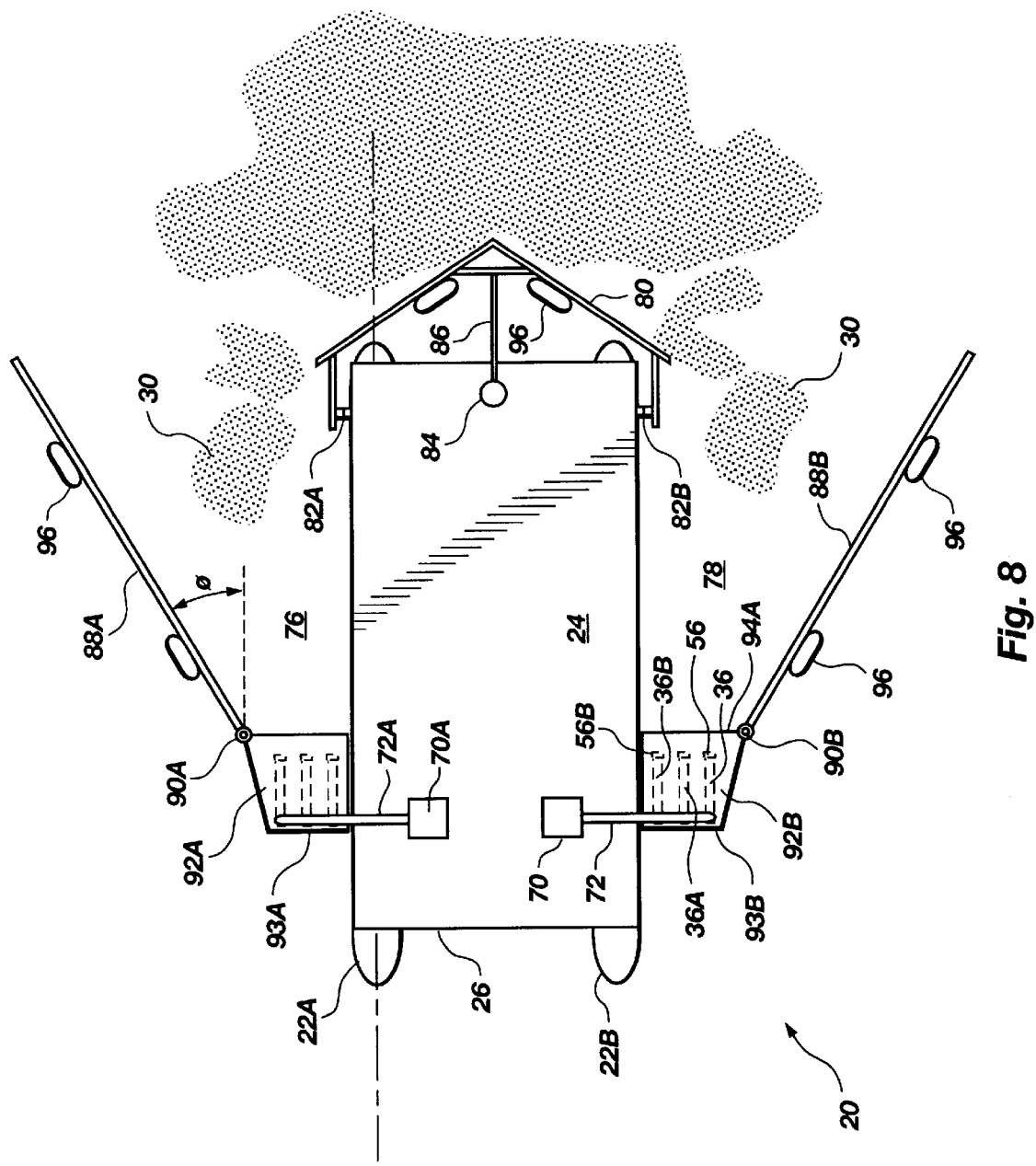
FIG. 8 is a top view of a boat with side arms and a moveable bow or "wedge", utilizing a bank of perforated hollow members to harvest brine shrimp.
Figure 9:
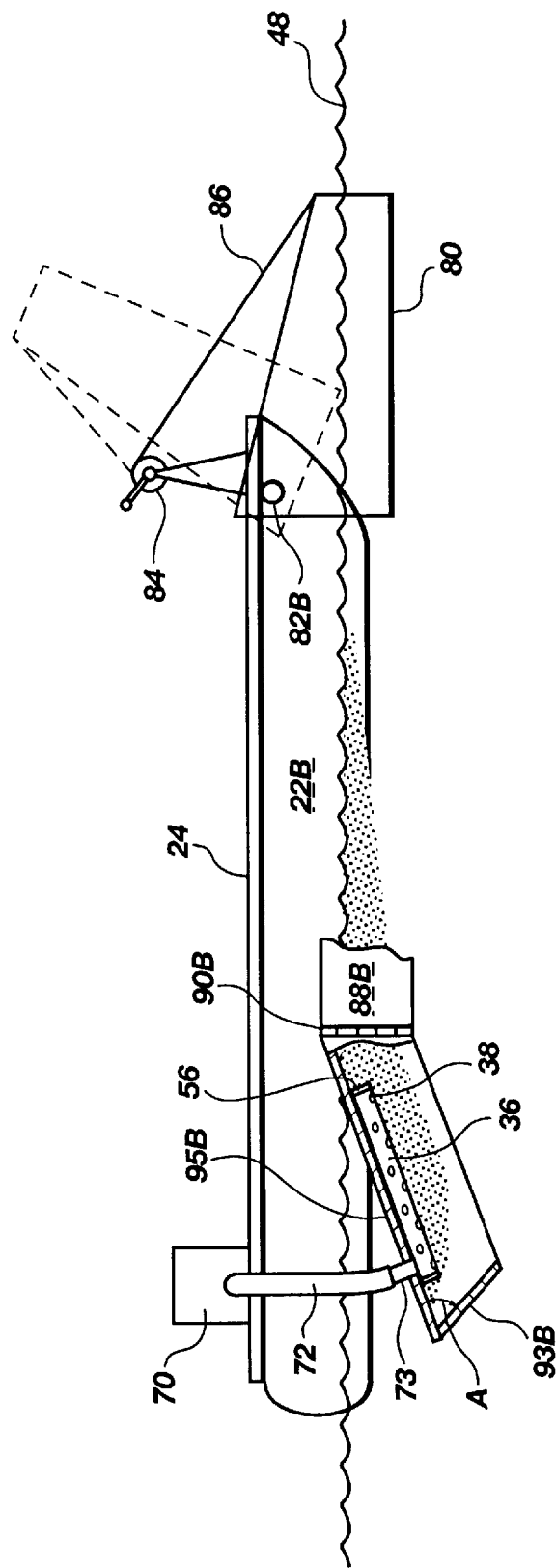
FIG. 9 is a side view of the boat of FIG. 8, the wedge of which is shown in a raised and lowered condition, the raised condition being shown in hatched lines.

FIGS. 8 and 9 depict another embodiment of the invention. In that embodiment, collection of the brine shrimp 30 takes place at the port and starboard sides of the boat 20. If the boat has an immobile bow as in the case of a dinghy (not shown), the bow serves to keep the brine shrimp 30 from passing underneath the keel. If the boat 20 does not have an immobile bow, but instead has one or more pontoons 22A, 22B supporting the platform or deck 24, a moveable bow wedge 80 may be utilized. In the depicted embodiment, the wedge 80 is hinged to the pontoons 22A, 22B or platform 24 at hinge points 82A, 82B. The wedge 80 may be raised or lowered by use of, for instance, a winch 84 attached to the wedge 80 by line, cord or rope 86. When the boat is not being used for harvesting brine shrimp and is, for example, returning to port, the hood or wedge may be raised (as shown in hatched lines in FIG. 9) to decrease the drag on the boat and increase its speed in the water.

To enhance the harvesting capacity of a boat as the boat travels through the water, side arms 88A, 88B may be used in the embodiment such as that depicted in FIGS. 8 and 9. The side arms 88A, 88B extend slightly under the water (e.g. six to twelve inches under the water) to provide a barrier for the surface water and associated brine shrimp. The side arms 88A, 88B are elongate members. The side arms typically, but not necessarily, have a length approaching that of the pontoons (e.g. the side arms 88A, 88B will typically have a length varying from about six to about eight yards) and a height of about six to about twenty-four inches. The side arms 88A, 88B rotate about the vertical axes defined by the hinges 90A, 90B. The side arms may be extended outwardly at an angle θ of between 30° to 180°. The side arms may be brought in by means of winches.

In the depicted embodiment, the side arms 88A, 88B are attached by hinges 90A, 90B to the cover or "hood" 92A, 92B. The hoods 92A, 92B are typically made of sheet metal, plywood, or plastic, and are formed to enclose partially the hollow perforated members 36, 36A, 36B. The hoods 92A, 92B are open at the fore 94A and underneath the hollow perforated members contained within the hoods 92A, 92B and have a back plate 93A, 93B. The hoods 92A and 92B do not have a bottom. As shown in FIG. 9, the back plate 93B typically extends in a generally perpendicular manner (e.g. 75° to 90°) from the top portion 95B of the subduction hood, although an angle A between the back plate 93B and the top portion 95B of about 80° is preferred to keep the eggs from passing underneath the back plate 93B. The side arms 88A, 88B and wedge 80 may be further supported by use of floats 96. This collector (i.e. the "hood" 92B with associated back plate 93B and top portion 95B together with pipes 36–36B arranged generally perpendicularly to and in fluid communication with pipe 72 or manifold 73 and extending towards the fore of the boat in a manner parallel to the longitudinal axes of the pontoons 22A, 22B) is referred to herein as a "subduction hood".

As best shown in FIG. 9, a side arm 88B acts to channel the brine shrimp to the perforated pipe(s) 36 placed underneath the hood 92B. The pipe 36 is capped with end cap 56 and connected to pump 70 by way of piping 72 and manifold 73. The pump 70 then directs the brine shrimp-rich water to the previously described collection area. The pipes may be interconnected by, for example, welds (in the case of metal) or adhesive (in the case of PVC pipe).

In one embodiment (not shown), the wedge is replaced by an appropriately sized subduction hood of a construction similar to subduction hoods 92A and 92B which extends between the pontoons. Such a subduction hood assembly may be affixed to the pontoons in a manner similar to that of the wedge so that it can be withdrawn from the water in a like manner as the wedge when the boat is heading, for example, back to port. It too is associated with a pump or pumps and appropriate pipe(s) 36 in the herein described manner. In such an embodiment, harvesting of the brine shrimp can take place both at the front and at the sides of the boat.

In one embodiment the piping is flexible so that the hood 92B and associated pipe 36 may be lowered or raised by use of a winch or other means (not shown) mounted on the deck 24 to adjust the depth of the pipe 36 within the water to optimize brine shrimp collection.

Figure 10:
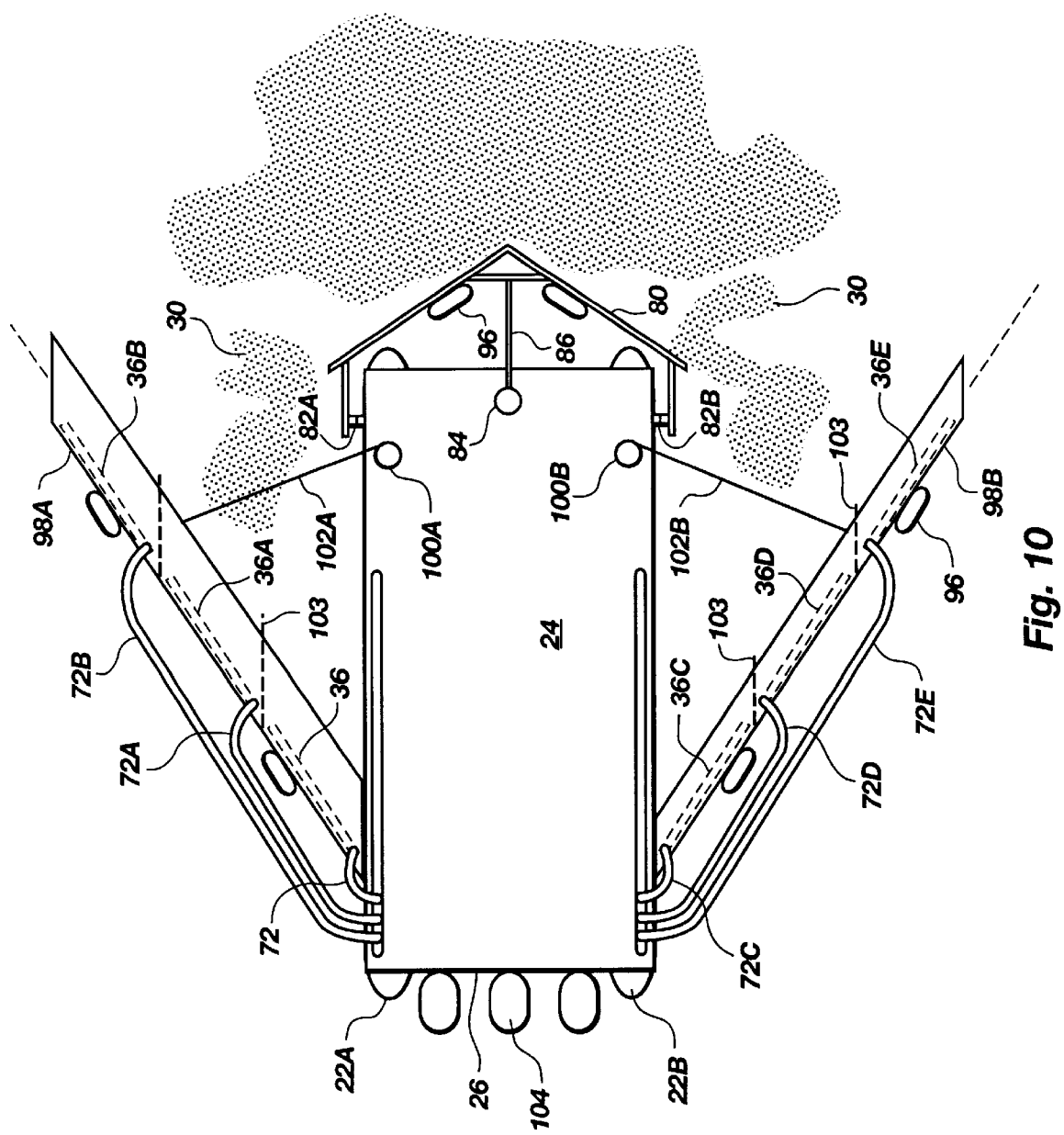
FIG. 10 is a top view of a boat with side arms and a moveable bow or wedge, utilizing side arms which incorporate the perforated hollow members to harvest brine shrimp.

In the embodiment depicted in FIG. 10, the side arms 98A, 98B incorporate the perforated pipes 36–36E which are positioned in individual compartments. In this construction the sidearms are configured similar to the subduction hoods 92A and 92B. The sidearms, therefore, form a cover or hood around the top, back, and side of the pipes 36–36E. The apertures (not shown) in these pipes are preferably of varying size, with larger apertures (e.g. ⅝ to ¾ of an inch) existing in the pipes at the portions nearest the respective pump piping 72–72E than the apertures found at the ends of the pipes distal to the connection with the pump piping (e.g. ¼ to ⅝ inch). The pump piping 72–72E leads to a pump or pumps (not shown) for collection and discharge to the collection area.

Again, the pump piping 72–72E is preferably made of a flexible polymer so that the side arms can move inwardly and outwardly on hinges (not shown) attached to the boat or one of its components (e.g. the platform or pontoons). The side arms 98A, 98B are drawn inward by means of a winch 10A, 100B and associated lines 102A, 102B connected to the side arms 98A, 98B. When the side arms are in their innermost position (not shown), the boat is more hydrodynamic, and travels better through the water. The side arms 98A, 98B extend outwardly with movement of the boat in a forward direction so long as sufficient slack line 102A, 102B is given from the winches 100A, 100B.

Each of the sidearms 98A and 98B is fitted with one or more compartment forming walls 103. Each of these walls is positioned upright in a vertical plane to connect with the top of the hood on their utmost edge and extend downward into the water on their lower edge. The space between adjacent walls 103 forms a compartment in which a perforated hollow member 36 is positioned. The compartments tend to position a quantity of shrimp eggs about the respective hollow member of the compartment, thereby facilitating the operation of that hollow member 36.

In the embodiment of FIG. 10, the longitudinal axis of each of the hollow members 26 is positioned parallel to the longitudinal axis of the respective sidearm to which it is associated.

In the embodiments depicted in FIGS. 10 and 11, outboard motors 104 are shown mounted at the aft 26 of the deck 24. Other power sources to propel a boat utilizing the invention include inboard/outboard and inboard motors.

FIG. 11 also depicts a further embodiment of the invention. Again, the side arms 98A, 98B are adapted to incorporate the perforated pipes 36–36E, and the side arms themselves include a cover formed around the top, back, and side of the pipes 36–36E. The starboard side arm 98B is substantially identical to that depicted in FIG. 10. FIG. 12 depicts a portion of starboard side arm 98B in cross-section. As can be seen, the cover portion of the side arm 98B tends to collect (or "sweep") the brine shrimp 30 near the perforated hollow member 36D with forward movement of the boat.

The port side arm 98A of FIG. 11 depicts a situation where the hollow perforated member consists of a bank of hollow perforated members or pipes 36, 36A, 36B in fluid communication with their respective manifolds 73, 73A, 73B similar to that of FIGS. 8 and 9. It follows that the angle between the longitudinal axis of the sidearm and the longitudinal axis of the individual hollow member 36 is substantially identical to the angle between the longitudinal axis of the sidearm and the longitudinal axis of the pontoon or boat. The bank of pipes may consist of two or more perforated pipes which, when the side arm 98A is in its most outward position (FIG. 11), extend in a manner generally parallel to the longitudinal axis of pontoon 22A or the hull of a ship (not shown).

FIGS. 12 and 13 depict a portion of side arms 98B and 98A) respectively in cross-section. As can be seen, the perforated hollow member is positioned below the surface of the water 48, and the cover portion of side arm 98A again tends to direct the brine shrimp 30 near the apertures 38 of perforated hollow members 36D with forward movement of the boat. When the pump associated with the pipe 72A is actuated, the apertures 38 suck in the brine shrimp for passage down pipe 72A, through the pump and to the collection area. It should be noted that the manifold 73A extends into the water well below the level of the brine shrimp in the water.

FIG. 14 depicts an alternative embodiment of the invention of FIG. 13 wherein the hollow member is "V"-shaped, and the manifold 73A is in fluid communication with the lumen of the two portions of the hollow member 36, 36'. The second pipe 36' collects in the pocket of the hood, and achieves thorough collection.

Although the invention has been described with regard to certain preferred embodiments, the scope of the invention is to be defined by the appended claims.

What is claimed is:

1. An apparatus for collecting brine shrimp eggs floating in a body of water comprising:

an elongate pipe having an outer diameter of from about two to about four inches, said elongate pipe having a structure defining an interior space and an exterior surface, said structure defining apertures extending therethrough, communicating the interior space of the elongate pipe with the elongate pipe's exterior surface, said apertures extending along the elongate pipe's length, spacedly positioned from one to two inches apart along said length, said apertures being of a size sufficiently large to pass brine shrimp eggs therethrough, said apertures having diameters of about one fourth to about three fourths inch, said elongate pipe further being positionable so that said apertures may be submersed in water at and beneath a level wherein brine shrimp eggs float in the water;

a pump, in fluid communication with the interior space of said elongate pipe, for creating a vacuum in said interior space for drawing water containing brine shrimp eggs through said apertures and into said interior space and thereafter withdrawing said water containing brine shrimp from within the interior space of said elongate pipe and directing it to a storage container, wherein said pump is in fluid communication and connection with one end of said elongate pipe, and wherein the diameter of the apertures proximal the fluid communication and connection with the pump are dimensionally smaller than the diameters of said apertures distal the fluid communication and connection with the pump.

2. The apparatus of claim 1 further including structure for positioning said elongate pipe such that a top portion of the exterior surface of said elongate pipe is submersible in water from about two inches to about eight inches below a surface of said body of water.

3. The apparatus of claim 1, wherein said apparatus comprises a plurality of elongate pipes arranged parallel to one another.

4. The apparatus of claim 3, wherein said elongate pipes are further all positioned in a horizontal plane.

5. A vessel comprising:

a buoyant portion for floating on a surface of a body of water which contains brine shrimp eggs, said buoyant portion comprising two parallel pontoons having a deck extending therebetween;

a hollow member having apertures therein, positioned circumferentialy about the hollow member, and associated with said buoyant portion in such a manner that at least a portion of said hollow member has apertures extending below the surface of the body of water, wherein the apertures are positioned at a plurality of depths below the surface of the body of water; and a pump in fluid communication with an interior of said hollow member, to withdraw fluid from said interior of said hollow member, and for further drawing water and any associated brine shrimp eggs proximate said apertures into said interior of said hollow member through said apertures;

wherein one of the pontoons and the hollow member each have their own repective longitudinal axes; the longitudinal axis of the hollow member being oriented perpendicular to the longitudinal axis of the pontoon; and the hollow member extends between the pontoons.

6. A vessel comprising:

a buoyant portion for floating on a surface of a body of water which contains brine shrimp eggs, said buoyant portion comprising two parallel pontoons having a deck extending therebetween, a hollow member having apertures therein associated with said buoyant portion in such a manner that at least a portion of said hollow member having apertures extends below the surface of the body of water; and a pump in fluid communication with an interior of said hollow member, to withdraw fluid from said interior of said hollow member, and for further drawing water and any associated brine shrimp eggs proximate said apertures into said interior of said hollow member through said apertures wherein one of the pontoons and the hollow member each have their own respective longitudinal axes, the longitudinal axis of the hollow member being parallel to the longitudinal axis of the pontoon, wherein the buoyant portion further comprises a cross piece extending between the pontoons, said hollow member extending from the deck to the cross piece, and being associated with the buoyant portion at two attachment points, a first attachment point at said deck, and a second attachment point at said cross piece.

7. The vessel of claim 6, wherein the hollow member moves laterally about the attachment points.

8. A vessel comprising:

a buoyant portion for floating on a surface of a body of water which contains brine shrimp eggs, said buoyant portion comprising two parallel pontoons having a deck extending therebetween;

a hollow member having apertures therein associated with said buoyant portion in such a manner that at least a portion of said hollow member having apertures extends below the surface of the body of water;

a pump in fluid communication with an interior of said hollow member, to withdraw fluid from said interior of said hollow member, and for further drawing water and any associated brine shrimp eggs proximate said apertures into said interior of said hollow member through said apertures;

wherein the hollow member is operably associated with the buoyant portion at two attachment points.

9. The vessel of claim 8, wherein said hollow member swings from said attachment points.

10. The vessel of claim 9, wherein said pump is a reciprocating diaphragm pump, and the reciprocation of said pump moves the hollow member in water.

11. The vessel of claim 8 having a plurality of hollow members.

12. The vessel of claim 11 having a plurality of pumps.

13. An apparatus for harvesting brine shrimp eggs comprising:

a conduit having an interior;

elongate hollow members having a lumen in fluid communication with the interior of said conduit, said elongate hollow members being connected to said conduit in a generally perpendicular manner, and extending outwardly from said conduit for a distance, said elongate hollow members having apertures extending therethrough, the apertures sized to accept brine shrimp eggs floating in water proximate said elongate members;

a pump, in fluid communication with the interior of said conduit, for withdrawing fluid contained within the interior of the conduit and associated lumen of the elongate hollow members; and a hood partially encasing said elongate hollow members.

14. An apparatus for harvesting brine shrimp eggs comprising:

a conduit having an interior;

elongate hollow members having a lumen in fluid communication with the interior of said conduit, said elongate hollow members being connected to said conduit in a generally perpendicular manner, and extending outwardly from said conduit for a distance, said elongate hollow members having apertures extending therethrough, the apertures sized to accept brine shrimp eggs floating in water proximate said elongate members wherein the apertures in the elongate hollow members vary in diameter, with apertures of a larger diameter being proximal the conduit; and a pump, in fluid communication with the interior of said conduit, for withdrawing fluid contained within the interior of the conduit and associated lumen of the elongate hollow members.

15. The apparatus of claim 14 further comprising structure disposed about each of said hollow members for defining an open-ended compartment about each said hollow member for retaining brine shrimp eggs in proximity of each said hollow member.

* * * * *